United States Patent [19]
Dittman et al.

[11] 3,743,853
[45] July 3, 1973

[54] ADJUSTABLE PROXIMITY SENSOR

[75] Inventors: Kenneth C. Dittman; Sunthorn Skulpone, both of Chicago, Ill.

[73] Assignee: Electro Corporation, Sarasota, Fla.

[22] Filed: Jan. 10, 1972

[21] Appl. No.: 216,679

[52] U.S. Cl............... 307/116, 317/DIG. 2, 336/83, 336/136
[51] Int. Cl............... H01f 15/02, H01f 21/06, H05
[58] Field of Search....................... 317/DIG. 2, 146; 324/41; 307/116; 336/83, 136

[56] References Cited
UNITED STATES PATENTS
3,197,658   7/1965   Byrnes et al................. 317/DIG. 2

Primary Examiner—L. T. Hix
Attorney—Axel A. Hofgren et al.

[57] ABSTRACT

An oscillatory proximity sensor which detects the presence of a conductor or metal adjacent the coil of an oscillator by virtue of the change in amplitude of the oscillations. The coil, oscillator and detector circuit are located within a probe housing mounted at the sensing location and the oscillator and detector utilize printed, integrated or hybrid circuitry. An adjustable core for the coil provides a sensitivity adjustment.

6 Claims, 6 Drawing Figures

Patented July 3, 1973 3,743,853
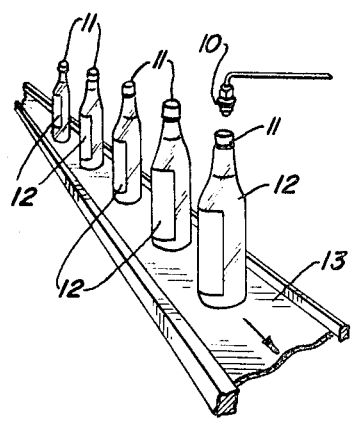
FIG. 1
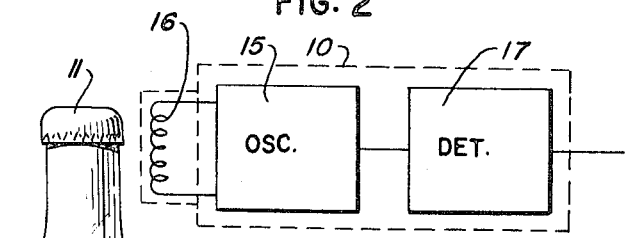
FIG. 2
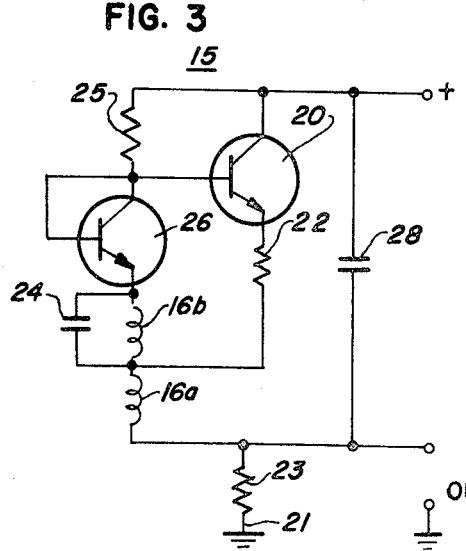
FIG. 3
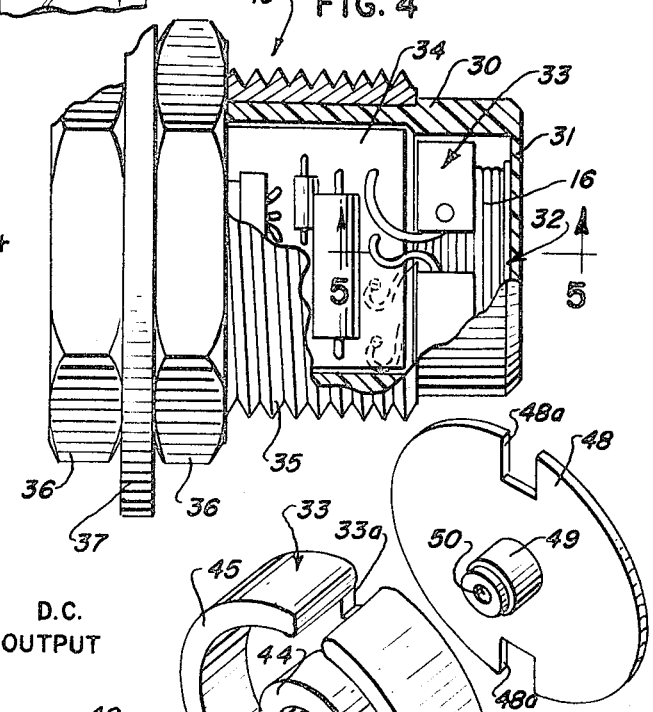
FIG. 4
FIG. 6
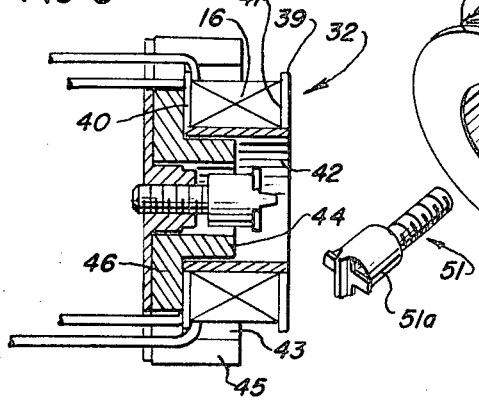
FIG. 5

ADJUSTABLE PROXIMITY SENSOR

This invention relates to an adjustable proximity sensor which detects the presence of a metal body in a sensing area adjacent a probe. In the past, it has been common to design such sensors with an oscillator coil in the probe connected through a cable with an oscillator and a detector circuit. An adjustable element, as a potentiometer, in the circuit permits setting the sensitivity of the circuit, i.e., the distance between the probe and a body of conducting material at which the circuit will switch from one condition to the other. There is generally some hysteresis in the circuit so that as a metal body moves into the probe field, a "metal present" indication is given at a slightly smaller distance than the spacing where a "metal away" indication is given as the body moves out of the field.

The cable length is a significant factor in the oscillator operation and the cable capacity often forms a part of the oscillator circuit. Accordingly, the oscillator and the detector, normally in a rather large box, must be near the sensing location. This is often inconvenient. Furthermore, the signal level in the coil and cable is quite low and the circuit is subject to interference from electrical noise and other signals which may be present at the sensing location. Examples of the prior circuits are found in U.S. Pat. Elam No. to Re24,779 and Hardin et al. U.S. Pat. No. 3,473,110.

With the availability of small semiconductor circuit components and integrated circuits, it has become feasible to incorporate the oscillator and the detector circuitry in the probe housing with the oscillator coil. A multiconductor cable provides supply voltage and an output, which may be digital in character, i.e., either the presence or absence of voltage, and relatively unaffected by cable length or electrical interference.

The operating characteristics of an oscillator used in a proximity sensor depend on several variables. Those characteristics which determine the sensitivity of the sensor include the coupling between sections of the oscillator coil, the Q of the coil, the gain of the amplifier and the tolerances of other circuit components. Even where expensive low tolerance or selected components are used, the range of sensing distances is large. In prior sensors, with the circuit in a unit separate from the coil assembly, it has been common to provide a sensitivity control, generally a variable potentiometer used to establish a desired bias condition in the circuit, selecting the appropriate sensing distance. In the present sensor with the circuit located in the sensor housing, this is neither economically nor mechanically feasible.

It has been found that the major variable factors, the coefficient of the coupling of the coil and the Q of the coil assembly may be compensated sufficiently to establish a sensing distance within a reasonable range, as between 200 and 250 mils, by tuning the coil. In accordance with the invention, the coil is provided with an adjustable core member which is set before the coil and circuit are placed in the probe housing and sealed with the body of insulating material.

One feature of the invention is the provision in a proximity sensor having an oscillator with tuned circuit including coil, and detector means, of a core adjustably positioned with respect to the coil for varying the sensitivity of the sensor. More particularly, the coil, adjustable core, oscillator and detector are located in a housing to be mounted at a sensing location.

Another feature of the invention is that the coil is wound on a bobbin and the core is threaded into a boss on a base member secured to an end wall of the bobbin and which extends into the axial center opening of the bobbin, minimizing the space required for the core.

A further feature is that the bobbin is located in a cup core of ferrite material having an annular channel between inner and outer annular walls, with the adjustable core extending within the inner annular wall.

And another feature is that the bobbin is received within a cylindrical housing sleeve with a closed face and that the end wall of the bobbin opposite the wall to which the base is secured is positioned against the inner surface of the closed housing face.

Other features and advantages of the invention will readily be apparent from the following specification and the drawings, in which:

FIG. 1 is a diagrammatic illustration of a typical counting system using a proximity sensor;

FIG. 2 is a block diagram of a proximity sensor of the type with which the invention is concerned;

FIG. 3 is a schematic diagram of the oscillator of the proximity sensor;

FIG. 4 is a fragmentary elevation of the probe with a portion of the housing broken away, illustrating the coil and circuit board;

FIG. 5 is an axial section of the coil and core; and

FIG. 6 is an exploded view of the coil and core assembly.

Proximity sensors have found many applications in industry where the determination of the presence or absence of a conductive or metal body is useful. Illustrated in FIG. 1 is a counting system where sensor 10 is positioned adjacent the path of metal caps 11 of bottles 12 on conveyor 13. As each bottle passes sensor 10, its presence is detected, and a signal is generated which may be used to actuate a counter, not shown.

The proximity sensor is illustrated in more detail in FIG. 2. Oscillator 15 includes a coil 16 which is located immediately adjacent the path of conductive metal bottle caps 11. The output of the oscillator is connected with a detector circuit 17 which provides an on-and-off or digital signal indicating whether or not a conductor is present in the field sensing zone adjacent oscillator coil 16. A digital "1" represents either the presence or absence of a conductor, depending upon the detector switching configuration and the logic convention which is selected. Oscillator 15, coil 16 and detector 17 are all located within probe housing 10.

A preferred form of oscillator circuit is illustrated in FIG. 3. In describing this circuit, component types and values will be given. It is to be understood that this specific information is included solely as an example of an operative circuit and any changes and modifications will be apparent to those skilled in the art. The oscillator utilizes an NPN transistor 20, 2N3860, with its collector connected directly to a positive 12 volt source which has its negative terminal connected with a reference potential or ground 21. The emitter of oscillator transistor 20 is connected through resistor 22, 180 ohms, the portion 16a of the oscillator coil and resistor 23, 150 ohms, to ground.

The frequency of the oscillator is established by coil section 16b and shunt capacitor 24, 3,900 pf, connected between the emitter circuit and the base, 1 MH$_z$ is typical. Suitable bias for the oscillator is established by a voltage divider made up of a resistor 25, 18,000 ohms and diode connected transistor 26, 2N3663, the base of the oscillator being connected to the junction between them. Capacitor 28, 0.047 μf, provides an RF by-pass for output resistor 23.

The maximum oscillation amplitude is achieved without metal in the field of coil 16. With metal in the field, losses occur which decrease the oscillation amplitude. The DC current through oscillator transistor 20 and through resistor 23 varies with the amplitude of the oscillations. Thus, the DC voltage across resistor 23 indicates the presence or absence of metal in the sensing field and may be utilized to control a bistable switch in detector 17. The details of the switch are not shown as they form no part of the present invention. A Schmitt trigger may, for example, be used.

The mechanical construction of probe 10 is illustrated in FIG. 4. A plastic sleeve 30 has a closed end face 31. Coil 16 is wound on bobbin 32, illustrated in more detail in FIGS. 5 and 6. A ferrite core 33 is mounted on bobbin 32 remote from the face 31 of sleeve 30. A circuit board 34 carries the components of the oscillator 15 and detector 17. The circuit board may utilize printed, integrated or hybrid circuit techniques. Where the number of units to be manufactured with a common circuit design is sufficient to warrant the initial expense of developing an integrated circuit, this is preferable to use of a printed or hybride circuit on which individual components must be mounted. The circuit board 34 is positioned immediately adjacent the assembly of coil 16, bobbin 32 and core 33 and extends axially of the sleeve 30, rearwardly of the coil. The coil itself is immediately adjacent end face 31 of the sleeve to provide an effective sensing zone extending as far as possible from the probe surface. A threaded shell 35 surrounds the sleeve 30, extending rearwardly from a point immediately to the rear of coil 16, so as not to interfere with the sensing zone of the coil. A pair of nuts 36 on the shell provide for an adjustable mounting of the probe from a support plate 37.

Referring now to FIGS. 5 and 6, details of the construction of the coil assembly will be discussed. Bobbin 32 has a spool-shaped configuration with a pair of spaced end walls 39 and 40 which define a channel 41 within which coil 16 is received. A center opening 42 extends axially through the bobbin.

Ferrite cup core 33 has an annular channel 43 defined by annular inner and outer walls 44, 45 joined by end wall 46. It is secured to bobbin end wall 40 with annular inner wall 44 extending into the bobbin center opening 42. Base member 48, preferably of plastic, is secured to the outer surface of end wall 46 of cup core 33 and has thereon a boss 49 which extends inside annular wall 44 and into the center opening 42 of bobbin 32. Boss 49 has a threaded axial passage 50 into which adjustable ferrite core member 51 is threaded. The head 51a of the adjustable core is positioned generally on the axis of bobbin 32 within the center opening 42, and overlapping the end of inner wall 44. Axial adjustment of ferrite core 51 thus has a significant effect on the characteristics of coil 16.

In the manufacture of the proximity sensor, coil 16 is wound on bobbin 32. The coil and bobbin are then assembled with ferrite cup core 33 and secured thereto with a suitable adhesive. Base member 48 is similarly mounted in a fixed position with respect to the coil 16 by securing it to the outer surface of end wall 46 of cup core 33 with a suitable adhesive. The terminal leads 16c of coil 16 are brought out through aligned slots 40a, 33a and 48a in the bobbin, cup core and base member respectively, and secured with circuit board 34, FIG. 4. Prior to insertion of the coil, core and circuit board into sleeve 30, the oscillator is activated and coil 16 is placed a selected distance from a metal body. Core member 51 is then adjusted for the appropriate circuit condition. This calibrates the sensor circuit and compensates for variations in the circuit characteristics discussed above. If the end of the threaded portion of the adjustable core member 51 projects beyond the surface of base member 48, as illustrated in FIG. 5, it is ground off.

The coil, core and circuit board are then inserted in sleeve 30 with the end wall 39 of bobbin 32 immediately adjacent the inner surface of end face 31 of the sleeve. The end wall and sleeve face are secured together with a suitable adhesive. A cable (not shown) providing power and output connections to the circuit is attached to the circuit board. The interior of sleeve 30 is filled with a suitable encapsulating or potting compound. The sensing characteristics of the proximity unit are thus established within desired limits, without utilizing expensive adjustable circuit components.

We claim:

1. In a proximity sensor having an oscillator with a tuned circuit, including a coil and detector means responsive to the amplitude of the oscillations for indicating the presence of metal in proximity to the coil, the improvement comprising: a bobbin with spaced end walls and an axial center opening therethrough, said coil being wound about said bobbin between the spaced end walls; a base secured to one end wall having a boss thereon with a threaded bore therethrough, said boss extending into the center opening of said bobbin; and a core threaded into said boss and adjustable in position therein with respect to the coil for varying the sensitivity of the sensor.

2. In a proximity sensor having an oscillator with a tuned circuit, including a coil and detector means responsive to the amplitude of the oscillations for indicating the presence of metal in proximity to the coil, the improvement comprising: a bobbin with spaced end walls and a center opening therethrough, said coil being wound about said bobbin between the spaced end walls; a cup core of ferrite material having an annular channel in which said bobbin is received; and a core mounted to move relative to the coil within the center opening of said bobbin for varying the sensitivity of said sensor.

3. The proximity sensor of claim 2 in which said cup core has an annular wall within said bobbin opening and said adjustable core extends within said annular wall.

4. The proximity sensor of claim 3 having a base secured to one end wall of said bobbin, said base having a boss with a threaded bore therethrough extending inside the annular wall of the cup core, said adjustable core being threaded into said boss.

5. The proximity sensor of claim 1 which said bobbin is received within a cylindrical sleeve having a closed face, with the other end wall of said bobbin positioned against the inner surface of said face.

6. The proximity sensor of claim 5 in which said oscillator and detector means utilize semiconductor elements mounted on a circuit board, said circuit board being positioned within said sleeve and extending axially thereof from said one end wall of the bobbin.

* * * * *